United States Patent [19]

Hayashi et al.

[11] 4,266,439
[45] May 12, 1981

[54] VIBRATION DAMPING DEVICE FOR A MECHANICAL CLUTCH RELEASE SYSTEM

[75] Inventors: Shinjiro Hayashi; Kiyoshi Taniyama; Kenichi Kikuchi, all of Toyota; Teruo Akashi, Okazaki, all of Japan

[73] Assignee: Toyota Jidosha Kogyo Kabushiki Kaisha, Toyota, Japan

[21] Appl. No.: 945,694

[22] Filed: Sep. 25, 1978

[30] Foreign Application Priority Data

Feb. 2, 1978 [JP] Japan .............................. 53-11859[U]

[51] Int. Cl.³ .......................... F16C 1/10; F16D 23/00
[52] U.S. Cl. .................................. 74/501 R; 188/1 B; 192/30 V
[58] Field of Search ............................ 192/30 V, 99 S; 188/1 B; 174/42; 267/136; 248/559; 74/501 R

[56] References Cited

U.S. PATENT DOCUMENTS

| 2,219,893 | 10/1940 | Goss | 174/42 |
| 2,267,171 | 12/1941 | Rubiesow | 188/1 B X |
| 3,246,073 | 4/1966 | Bouche et al. | 174/42 |
| 3,826,339 | 7/1974 | Brokaw | 174/42 X |

FOREIGN PATENT DOCUMENTS 52-35862  1/1973  Japan .
52-26656  3/1973  Japan .
52-8899   4/1973  Japan .

*Primary Examiner*—Rodney H. Bonck
*Attorney, Agent, or Firm*—Stevens, Davis, Miller & Mosher

[57] ABSTRACT

A vibration damping device for a mechanical clutch release system comprising a damper weight mounted to an inner cable connected to a release fork by a clevis. The damper weight is provided with an axial bore for receiving the inner cable, two slits formed on diametrically opposite sides of the axial bore, a bolt for securely holding the inner cable in the axial bore and a cylindrical portion provided near the release fork to coaxially encircle the clevis.

3 Claims, 13 Drawing Figures

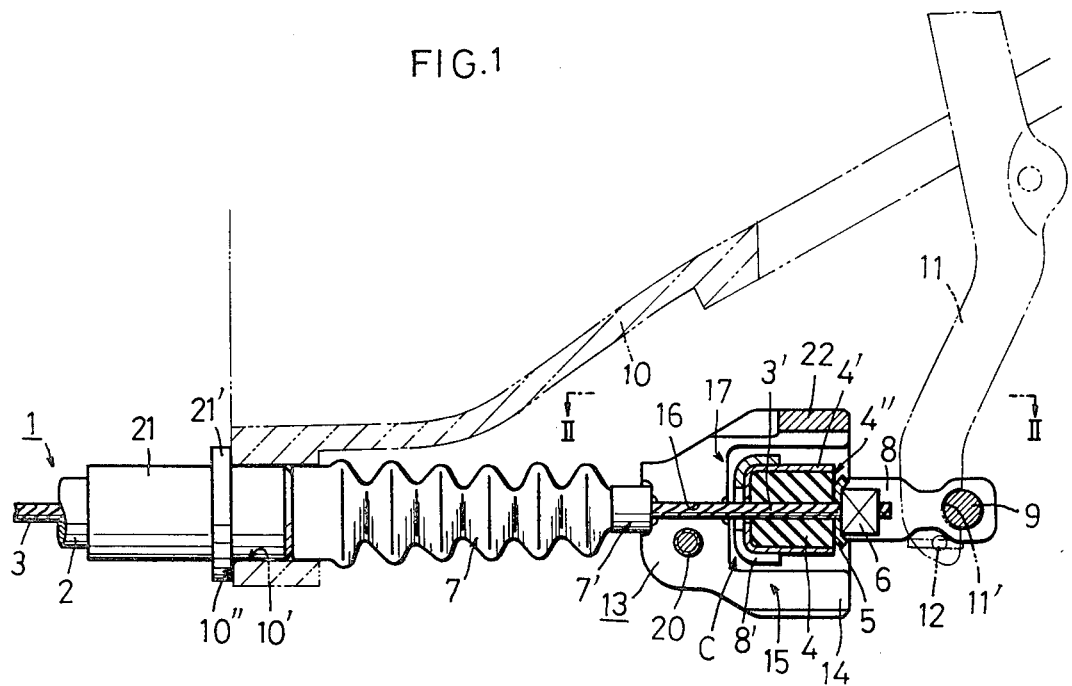
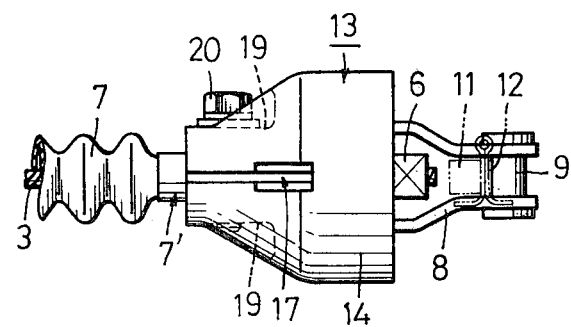
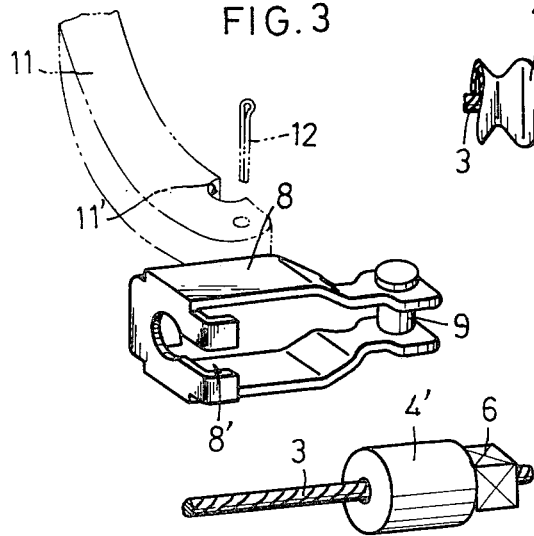

VIBRATION DAMPING DEVICE FOR A MECHANICAL CLUTCH RELEASE SYSTEM

The present invention relates to a mechanical clutch release system for a motor vehicle, and more particularly, to a device for damping vibration to prevent transmission of vibration from the friction clutch to the vehicle body through the clutch release system.

In a conventional vehicle utilizing a mechanical clutch release system, vibration from the friction clutch or the engine is transmitted through the clutch release system to the dash panel and the pedal bracket in the vehicle body, leading to generation of noise in the vehicle.

Previous to considering means for preventing transmission of such vibration, the present inventors conducted various feeling tests to study the vibration causing the noise in the vehicle and the course of its transmission through the clutch release system. As a result, they have found that the major cause for generation of the noise in the vehicle is vibration generated in the clutch release bearing when the clutch pedal is worked to release the clutch. The vibration generated in the clutch release bearing is transmitted through the release fork and the inner cable to the dash panel, the clutch pedal and the pedal bracket to cause the noise in the vehicle.

In a conventional clutch release system, an impact absorbing member of elastic material such as rubber is interposed between the inner cable and a clevis connected to the release fork for preventing transmission of vibration through the inner cable. However, as hereinabove described, the vibration is generated in the clutch release bearing when the clutch is released, and the impact absorbing member is compressed in this condition. When the impact absorbing member is thus compressed, its vibration damping capacity is lowered in comparison with that in the normal condition. Thus, the aforementioned impact absorbing member is not completely satisfactory in damping the vibration generated in the clutch release bearing.

In a conventional motor vehicle, there is also used a damper weight for damping the aforementioned vibration. However, it is rather difficult to fit such a damper weight in the clutch release system, and further, it requires a large space. This type of damper weight can be fitted only at the sacrifice of its vibration damping capacity.

It is an object of the present invention to provide a device for damping vibration in a clutch release system which can satisfactorily prevent transmission of vibration generated in the clutch release bearing. The object may be attained by providing a damper weight which is small in mass and mounted to an inner cable in a region where it can most effectively damp such vibration.

According to the present invention, there is provided a device for damping vibration in a mechanical clutch release system, comprising a damper weight mounted to an inner cable which is connected to a release fork by a clevis. The damper weight has an axial bore for receiving the inner cable, two slits provided on diametrically opposite sides of the axial bore, a bolt for securely holding the inner cable in the axial bore and a cylindrical portion provided near the release fork to coaxially encircle the clevis.

The device according to the present invention has the following advantages:

(1) A free space left in the system near the release fork is effectively utilized to place the cylindrical portion of the damper weight to obtain the necessary amount of mass for damping vibration without interfering in the system.

(2) The damper weight can be mounted to the inner cable while keeping the inner cable stretched by virtue of a first slit formed in the damper weight.

(3) Proper alignment of the damper weight and the inner cable is easily effected by locating the inner cable along an axial bore formed in the damper weight.

(4) The damper weight can easily be deformed to receive the inner cable by virtue of a second slit which is opposite to and narrower than the first slit.

(5) There is no need to modify the construction of any existing clutch release system for applying the device of this invention thereto.

(6) In addition to the damper weight, there is provided an impact absorbing member of elastic material which is inserted between the inner cable and the clevis to cooperate with the damper weight in damping the vibration.

The invention will now be described in further detail by way of example with reference to the accompanying drawings, in which:

FIG. 1 is a partially fragmentary top plan view of a clutch release system in which a device embodying the present invention is applied;

FIG. 2 is a rear elevational view of the device as viewed in the direction of the lines II—II of FIG. 1;

FIG. 3 is a fragmentary perspective view showing the inner cable, the clevis and the release fork in exploded relation;

Figure 4:
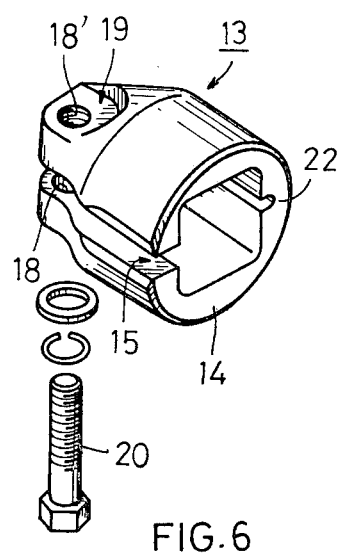
FIGS. 4 and 5 are perspective views showing the damper weight in different directions.

Attention is now drawn to FIGS. 1 and 2 of the drawings in which a clutch housing 10 of a mechanical clutch release system for a vehicle is shown partly in section. Numeral 1 shows a clutch cable comprising an outer cable 2 which is secured at one end to a cap 21 having a flange 21' and an inner cable 3 extending longitudinally in the outer cable 2 to move along the axis thereof upon working of a clutch pedal (not shown). The inner cable 3 extends outwardly from an end 7' of a dust boot 7 arranged in abutment with the cap 21. A part of the outwardly extending portion 3' of the inner cable 3 is coaxially surrounded by an impact absorbing member 4 of elastic material such as rubber for damping vibration. The impact absorbing member 4 is enclosed in a metal cover 4' except one end 4" as shown on the right-hand side of FIG. 1. A head 6 is secured by calking to the end of the inner cable 3 extending beyond the impact absorbing member 4, and a washer 5 is interposed between the end 4" of the impact absorbing member 4 and the head 6.

The clutch cable 1 is inserted into the clutch housing 10 through an opening 10', whereby the flange 21' of the cap 21 is in contact with the end surface 10" of the clutch housing 10 to effect proper location of the outer cable 2. The inner cable 3 is connected with a clevis 8 by engagement of the impact absorbing member 4 with the clevis 8 through a recess 8', whereby the clevis 8 contacts the cover 4' of the impact absorbing member 4 (see FIG. 3). The clevis 8 has a pin 9 to be fitted with a groove 11' in a release fork 11 which is provided with a cotter pin 12 to prevent displacement of the pin 9 from the groove 11'.

The other ends (not shown) of the outer and inner cables 2 and 3 are respectively connected with a dash panel (not shown) and the clutch pedal (not shown) in the vehicle body.

When the clutch pedal is worked, the inner cable 3 is pulled in the left-hand direction in FIG. 1 to pull the impact absorbing member 4 and the clevis 8 to rotate the release fork 11 clockwise and thereby release the clutch by operation of a clutch release bearing (not shown). In this condition, it is unavoidable in the conventional system that vibration generated in the clutch release bearing is transmitted to the vehicle body through the release fork 11, the clevis 8, the impact absorbing member 4 which is now compressed and the inner cable 3, as hereinabove described.

In the embodiment of the present invention, a damper weight 13 is provided on the inner cable 3 to damp the vibration generated in the clutch release bearing. As is obvious from FIGS. 4 through 9, the damper weight 13 is made by monoblock die casting from a corrosion-resisting material such as zinc. The damper weight 13 has an axial bore 16 along its central axia A—A (FIG. 6) to receive the inner cable 3 therein. The axial bore 16 communicates with a first slit 15 through which the inner cable is inserted and a second slit 17 which is opposite to and narrower than the first slit 15. Since the second slit 17 is narrower than the first slit 15 and than the diameter of the inner cable 3, the peripheral wall of the axial bore 16 adjacent to the second slit 17 forms a shoulder which prevents movement of the inner cable 3 into the second slit 17. The second slit 17 ends at a portion 22 connecting the upper and lower parts of the damper weight 13.

Figure 5:
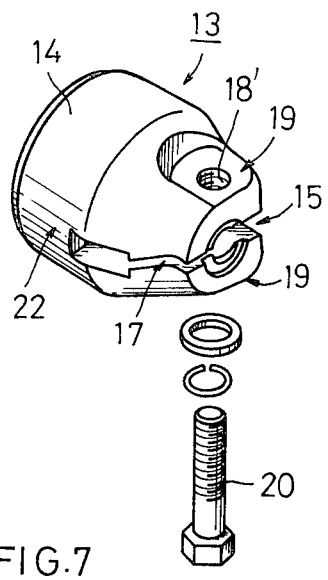
Figure 6:
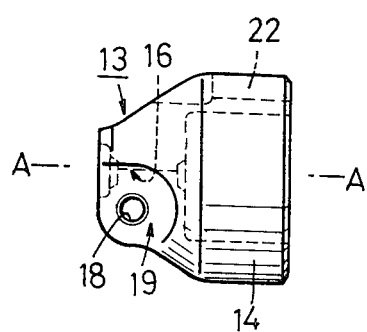
FIG. 6 is a top plan view of the damper weight.
Figure 7:
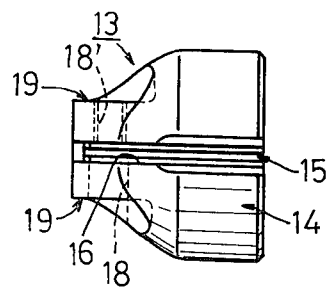
FIG. 7 is a front elevational view of the damper weight.
Figure 8:
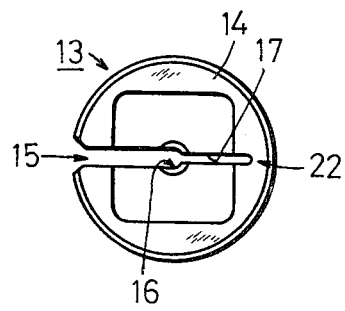
FIG. 8 is a right side elevational view of the damper weight.
Figure 9:
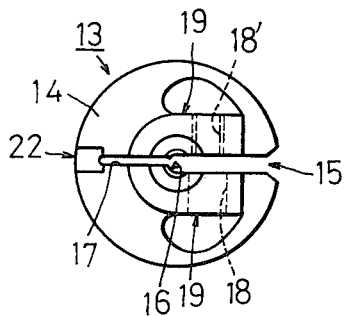
FIG. 9 is a left side elevational view of the damper weight.

The right-hand side of the damper weight 13 as viewed in FIG. 1 forms a cylindrical portion 14 which opens at its right-hand end. The left-hand side of the damper weight 13 is provided with a pair of opposite flat portions 19 in the upper and lower parts thereof and a through-hole 18 pierced in the flat portions 19 perpendicularly to the first slit 15, as shown in FIGS. 4 and 5. The upper half of the through-hole 18 is internally threaded at 18'.

In construction, a part of the inner cable 3 being exposed between the dust boot 7 and the clevis 8 is inserted into the left-hand side of the damper weight 13 through the first slit 15 while a part of the clevis 8 and the impact absorbing member 4 are placed in the cylindrical portion 14. The inner cable 3 is held in the axial bore 16 so that it is properly aligned with the damper weight 13. In this condition, a clearance is made between the inner surface of the cylindrical portion 14 and the clevis 8 as well as the outer surface of the cover 4' of the impact absorbing member 4 for preventing mutual interference (see FIG. 1).

The cylindrical portion 14 thus enclosing the clevis 8 and the impact absorbing member 4 is placed near the release fork 11 to take full advantage of a relatively wide space defined within the clutch housing 10 in the vicinity of the release fork 11 and thereby obtain the necessary amount of mass on the damper weight 13 for damping vibration without interfering in the clutch housing 10.

A bolt 20 is inserted into the internally threaded portion 18' of the through-hole 18 and tightened so that the inner cable 3 is securely held in the axial bore 16. Thus, the damper weight 13 is fixed to the inner cable 3 as shown in FIGS. 1 and 2.

Though the damper weight 13 is made by die casting, it is sufficiently resilient to receive the inner cable 3 in the axial bore 16 since the connecting portion 22 is made small by virtue of the second slit 17.

It is not desirable that the damper weight 13 interferes in the clevis 8, i.e., the damper weight 13 contacts the clevis 8 as hereinafter described. However, the clearance C as shown in FIG. 1 between the inner end of the cylindrical portion 14 and the end surface of the clevis 8 is not necessarily provided in advance since the impact absorbing member 4 is compressed to define the clearance C between the clevis 8 and the damper weight 13 when the clutch pedal is worked.

The inventors put the device of the present invention to the test with respect to its vibration damping capacity. The results are as follows:

I. METHOD

I-1. An accelerometer was mounted to the clutch pedal for sensing acceleration acting in the direction of its movement. Then the acceleration sensed by the accelerometer was amplified in a charge amplifier to make frequency analysis by a high-speed Fourier converter. The results were recorded on an XY recorder.

I-2. Simultaneously, a feeling test was made on the noise aurally heard in the vehicle.

II. PROCEDURE

II-1. The clutch pedal was worked while keeping the the engine speed constant. Frequency analysis was made when the vibration was felt most severe, and the result was recorded on the XY recorder.

II-2. The result of the frequency analysis effected while releasing the clutch pedal was subtracted from the result of the procedure II-1 to obtain the actual result of frequency analysis of vibration generated only when the clutch pedal was worked.

III. RESULTS

Figure 10:
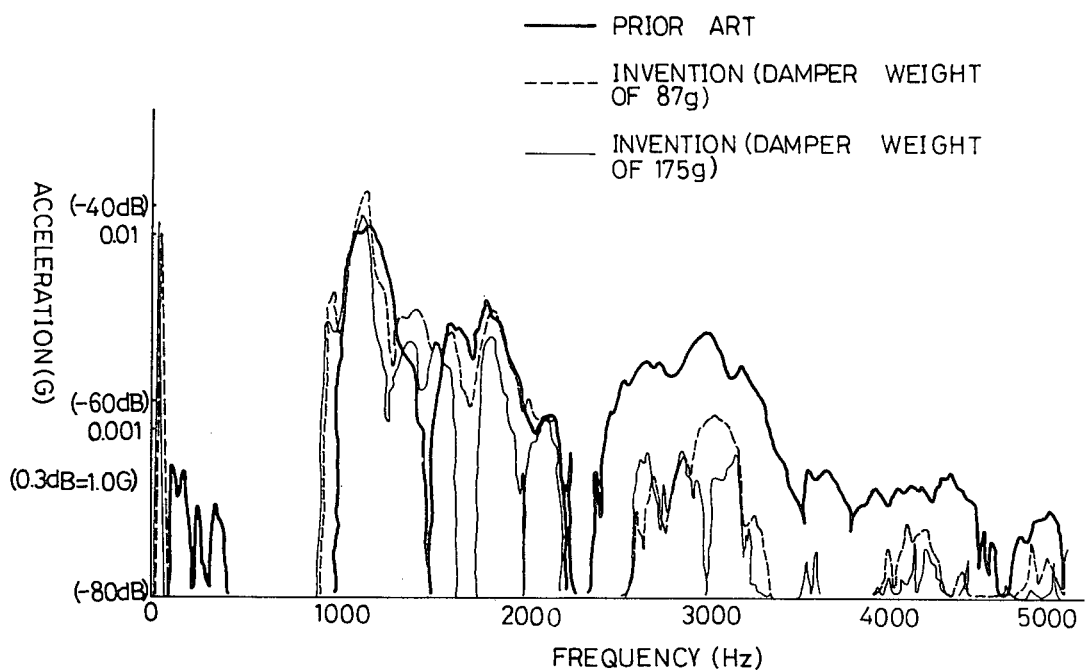
FIG. 10 is a graph showing results of frequency analysises made on the acceleration acting in the direction of the movement of the clutch pedal.

III-1. FIG. 10 is a graph showing the results of frequency analysis made by the method I-1 on the acceleration acting in the direction of the movement of the clutch pedal. The ordinate of the graph represents the acceleration in G and the abscissa represents vibration frequency in Hz. The acceleration is indicated in the parentheses by decibel in which −3.0 dB is equal to 1.0 G. The thick full line in FIG. 10 represents the result of frequency analysis in the conventional clutch release system provided only with an impact absorbing member of elastic material. The broken line represents the result of frequency analysis in the construction of the present invention utilizing the damper weight of 87 g, and the fine full line represents that utilizing the damper weight of 175 g.

As is clearly seen from FIG. 10, the broken line is lower and narrower than the thick full line within the frequency range of 2400 Hz through 3500 Hz, and the fine full line is still lower and narrower than the broken line.

These results in the frequency range of 2400 Hz through 3500 Hz corresponded with the results of the feeling test as effected by the method I-2. Thus, it was found that vibration in the vehicle could be reduced by lowering the acceleration acting in the direction of movement of the clutch pedal in the frequency range of 2400 Hz through 3500 Hz.

Figure 11:
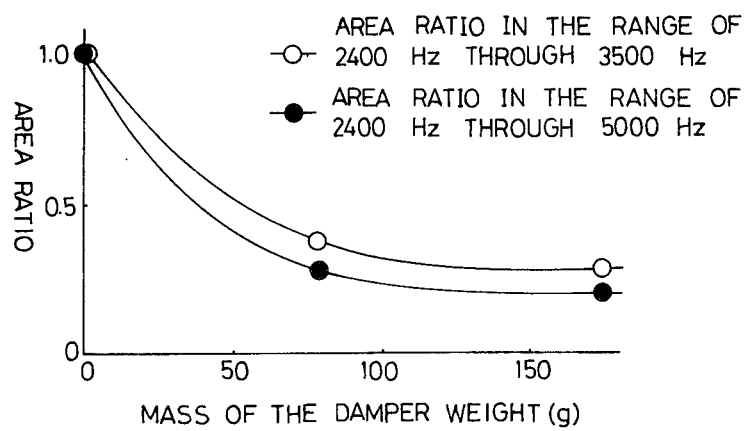
FIG. 11 is a graph showing the relation between the mass and the efficiency of the damper weight.

III-2. FIG. 11 is a graph showing the relation between the amount of the mass of the damper weight prepared according to the present invention and the efficiency thereof by area of the lines in FIG. 10 under the peaks in the frequency range from 2400 Hz up. The ordinate of this graph represents the area ratio to the conventional construction, and the abscissa represents the amount of the mass of the damper weight in grams. It is seen from FIG. 11 that the vibration damping efficiency of the damper weight is graphed by hyperbolic functional lines. Thus, the damper weight according to the present invention is fully effective in damping vibration with a relatively small amount of mass.

Figure 12:
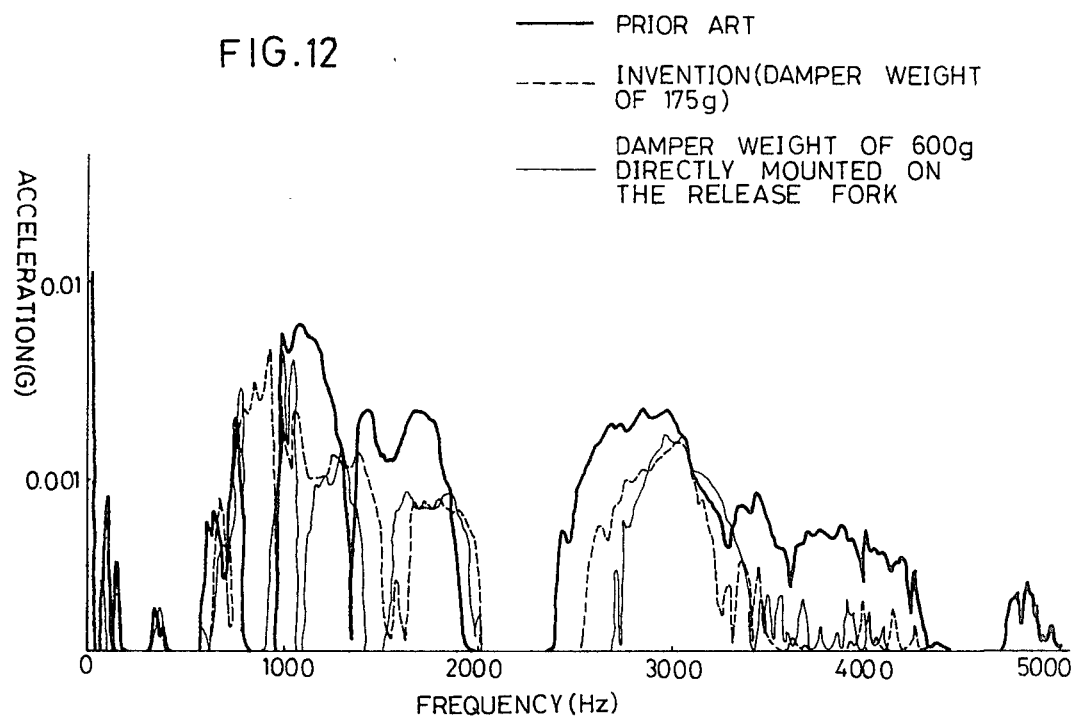
FIGS. 12 and 13 are graphs similar to FIG. 10 in which frequency analyses are made under different conditions.

III-3. FIG. 12 is a graph similar to FIG. 10 in which the thick full line represents the result of frequency analysis made on the acceleration acting in the direction of the movement of the clutch pedal in the conventional clutch release system, and the broken line represents the result of frequency analysis in the construction of the present invention utilizing the damper weight of 175 g. The fine full line represents the result of that in the construction in which a damper weight of 600 g is directly mounted on the release fork. As is obvious from FIG. 12, the amount of the mass of the damper weight must be increased by 3 to 4 times to obtain sufficient vibration damping capacity when the damper weight is directly mounted on the release fork.

Figure 13:
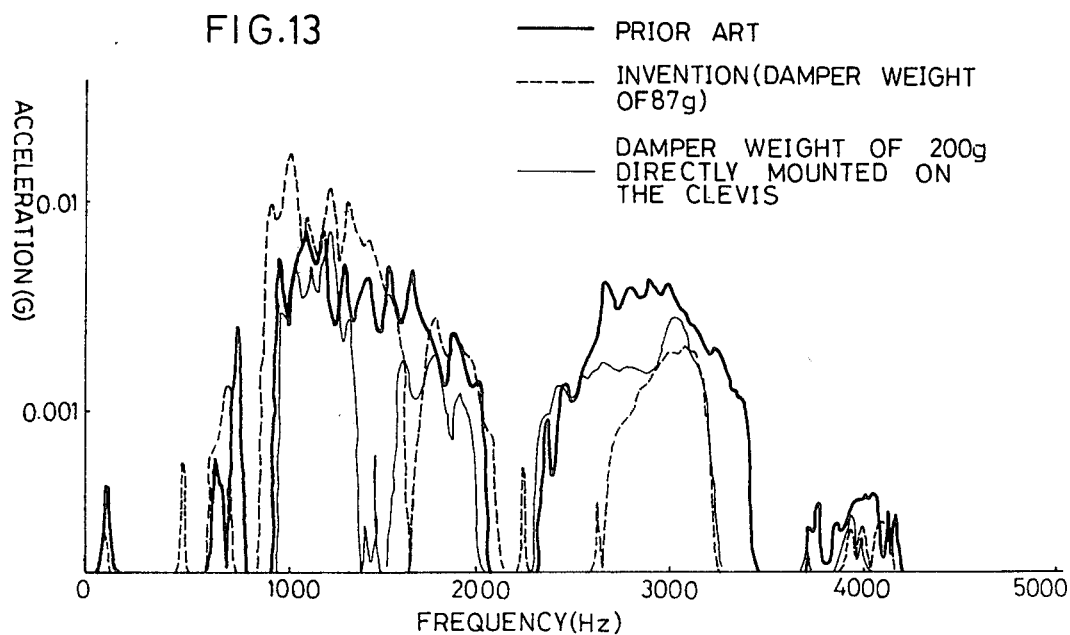

III-4. FIG. 13 is a graph similar to FIG. 12 in which the thick full line represents the result in the conventional clutch release system and the broken line represents the result in the construction of the present invention utilizing the damper weight of 87 g. The fine full line represents the result in the construction in which a damper weight of 200 g is directly mounted on the clevis. It is seen from FIG. 13 that the damper weight of 87 g is very effective in damping vibration in the frequency range from 2400 Hz up as compared with the damper weight of 200 g directly mounted on the clevis.

Thus, the amount of the mass of the damper weight must be increased by 3 to 4 times to obtain a sufficient vibration damping capacity when the damper weight is directly mounted on the clevis.

Although the impact absorbing member 4 is provided in addition to the damper weight 13 for damping vibration in the embodiment of the present invention, it is experimentally confirmed that vibration can sufficiently be damped by the damper weight 13 without the impact absorbing member 4.

While the invention has been described with reference to a preferred embodiment thereof, it is to be understood that modifications or variations may be easily made without departing from the scope of this invention which is defined by the appended claims.

What is claimed is:

1. In combination with a mechanical clutch release system having an inner cable and a clevis connecting said inner cable to a clutch release fork, a vibration damping device comprising a damper weight mounted to said inner cable in the vicinity of said clevis, said damper weight having a generally cylindrical hollow portion near said release fork to coaxially and spacedly encircle said clevis and said inner cable, said damper weight having a substantially solid portion longitudinally adjacent to said cylindrical hollow portion and having an axial bore for holding said inner cable therein, a first slit provided along the entire length of said damper weight and through a wall portion of said hollow portion and communicating with said axial bore to permit movement of said inner cable into and out of said axial bore and said hollow portion, and a bolt extending normal to said first slit for securely holding said inner cable in said axial bore.

2. The invention as defined in claim 1 wherein said damper wall portion further has a second slit which is in the plane of said first slit, but opposite thereto with respect to said axial bore, said second slit being narrower than the width of said first slit and the diameter of said inner cable, said second slit longitudinally extending along the entire length of said damper weight, but transversely terminating within a wall portion of said hollow portion which is diametrically opposite to said first mentioned wall portion.

3. The invention as defined in claim 1 wherein an impact absorbing member for damping vibration is further provided in engagement with said clevis to connect said inner cable with said clevis.

* * * * *